US012640869B2

(12) United States Patent
Yuan et al.

(10) Patent No.: US 12,640,869 B2
(45) Date of Patent: May 26, 2026

(54) DYNAMIC PUCCH REPETITION INDICATION

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 18/018,538

(22) PCT Filed: Sep. 24, 2021

(86) PCT No.: PCT/CN2021/120239
§ 371 (c)(1),
(2) Date: Jan. 27, 2023

(87) PCT Pub. No.: WO2022/063218
PCT Pub. Date: Mar. 31, 2022

(65) Prior Publication Data
US 2023/0299906 A1 Sep. 21, 2023

(30) Foreign Application Priority Data
Sep. 25, 2020 (WO) ............... PCT/CN2020/117624

(51) Int. Cl.
H04L 5/00 (2006.01)
H04W 72/21 (2023.01)
H04W 72/23 (2023.01)
(52) U.S. Cl.
CPC ........... H04L 5/0048 (2013.01); H04W 72/21 (2023.01); H04W 72/23 (2023.01)

(58) Field of Classification Search
CPC ..... H04L 5/0048; H04L 5/001; H04L 5/0051; H04L 5/0055; H04L 5/0057; H04L 1/08;
(Continued)

(56) References Cited

U.S. PATENT DOCUMENTS

2019/0230685 A1* 7/2019 Park ...................... H04L 1/1854
2020/0029335 A1 1/2020 Yang et al.
(Continued)

FOREIGN PATENT DOCUMENTS

CN 110535609 A 12/2019
CN 111213416 A 5/2020
(Continued)

OTHER PUBLICATIONS

Supplementary European Search Report—EP21871587—Search Authority—The Hague—Jul. 18, 2024.
(Continued)

*Primary Examiner* — Peter P Chau
*Assistant Examiner* — David Zhijun Sun
(74) *Attorney, Agent, or Firm* — QUALCOMM Incorporated

(57) ABSTRACT

Aspects presented herein relate to methods and devices for wireless communication including an apparatus, e.g., a UE and/or a base station. The apparatus may receive, from a base station, a radio resource control (RRC) message including an indication of a number of physical uplink control channel (PUCCH) repetitions. The apparatus may also receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. The apparatus may also transmit, to the base station,
(Continued)

a PUCCH via the PUCCH resource of the one or more PUCCH resource sets, the transmitted PUCCH corresponding to the number of PUCCH repetitions.

23 Claims, 12 Drawing Sheets

(58) Field of Classification Search
CPC ... H04L 1/1825; H04L 1/1854; H04L 1/1861; H04L 1/1896; H04L 5/0053; H04L 5/0094; H04W 72/21; H04W 72/23; H04W 80/02; Y02D 30/70
See application file for complete search history.

(56) References Cited

U.S. PATENT DOCUMENTS

| | | | | |
|---|---|---|---|---|
| 2020/0205150 | A1* | 6/2020 | Cheng | H04W 72/21 |
| 2020/0259625 | A1* | 8/2020 | Papasakellariou | H04B 7/0456 |
| 2020/0383105 | A1* | 12/2020 | Park | H04L 1/1671 |
| 2022/0030443 | A1* | 1/2022 | Chen | H04W 72/21 |
| 2023/0299900 | A1* | 9/2023 | Gao | H04L 5/0023 |
| | | | | 370/330 |
| 2023/0354274 | A1* | 11/2023 | Shao | H04L 5/0012 |

FOREIGN PATENT DOCUMENTS

| | | |
|---|---|---|
| EP | 3471488 A1 | 4/2019 |
| EP | 4203581 A1 | 6/2023 |
| KR | 20200086215 A | 7/2020 |
| WO | 2020018545 A2 | 1/2020 |
| WO | 2022028108 A1 | 2/2022 |

OTHER PUBLICATIONS

Ericsson: "HARQ-ACK Enhancements for IIoT/URLLC", 3GPP TSG-RAN WG1 Meeting #102-e, R1-2005513 Aug. 28, 2020 (Aug. 28, 2020), 5 Pages, The Whole Document.
International Search Report and Written Opinion—PCT/CN2020/117624—ISA/EPO—Jun. 24, 2021.
International Search Report and Written Opinion—PCT/CN2021/120239—ISA/EPO—Dec. 23, 2021.
Lenovo, et al., "Discussion of Multi-TRP/Panel Transmission", 3GPP TSG RAN WG1 Meeting #98bis, R1-1910142, Chongqing, China, Oct. 14-18, 2019, the whole document, 15 Pages.
NTT Docomo, Inc., "Discussion on MTRP for Reliability", 3GPP TSG RAN WG1 #102-e, R1-2006719, Aug. 28, 2020 (Aug. 28, 2020), 7 Pages, The Whole Document.
NTT Docomo, Inc: "Discussion on Multi-Beam Enhancement", 3GPP Draft, 3GPP TSG RAN WG1 #98bis, R1-1911185, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051789957, pp. 1-20, Section 3.3, p. 4, paragraph [03.3]—p. 5, pp. 3-4, Section 3.2.

* cited by examiner

FIG. 6A

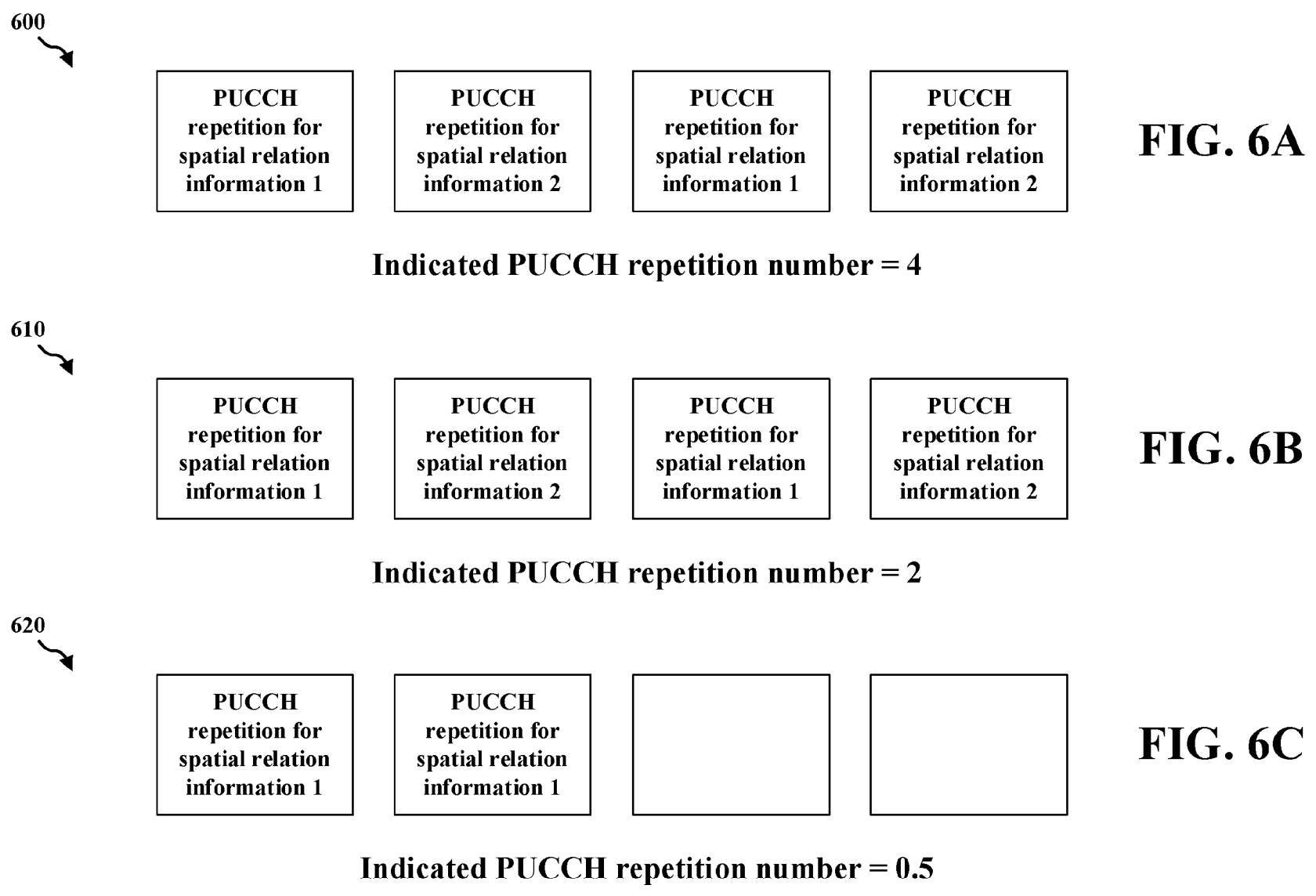

| PUCCH repetition for spatial relation information 1 | PUCCH repetition for spatial relation information 2 | PUCCH repetition for spatial relation information 1 | PUCCH repetition for spatial relation information 2 |

Indicated PUCCH repetition number = 4

| PUCCH repetition for spatial relation information 1 | PUCCH repetition for spatial relation information 2 | PUCCH repetition for spatial relation information 1 | PUCCH repetition for spatial relation information 2 |

Indicated PUCCH repetition number = 2

| PUCCH repetition for spatial relation information 1 | | |

Indicated PUCCH repetition number = 0.5

620

800

802

Receive RRC message including an indication of a
number of PUCCH repetitions

804

Receive DCI indicating a codepoint associated with the
number of PUCCH repetitions

808

Transmit a PUCCH via a PUCCH resource of one or
more PUCCH resource sets

900

902

Receive RRC message including an indication of a number of PUCCH repetitions

904

Receive DCI indicating a codepoint associated with the number of PUCCH repetitions

906

Select a PUCCH resource set of one or more PUCCH resource sets based on a UCI size

908

Transmit a PUCCH via the PUCCH resource of the one or more PUCCH resource sets

1000

1002

Transmit RRC message including an indication of a number of PUCCH repetitions

1004

Transmit DCI indicating a codepoint associated with the number of PUCCH repetitions

1006

Receive a PUCCH via a PUCCH resource of one or more PUCCH resource sets

DYNAMIC PUCCH REPETITION INDICATION

CROSS REFERENCE TO RELATED APPLICATION(S)

This application is a National Stage Application filed under 35 U.S.C. § 371 of PCT International Application No. PCT/CN2021/120239, entitled "DYNAMIC PUCCH REPETITION INDICATION" and filed Sep. 24, 2021, which claims the benefit of and priority to International Application No. PCT/CN2020/117624, entitled "METHODS AND APPARATUS FOR DYNAMIC PUCCH REPETITION" and filed on Sep. 25, 2020, which are expressly incorporated by reference herein in their entirety.

TECHNICAL FIELD

The present disclosure relates generally to communication systems, and more particularly, to physical uplink control channel (PUCCH) reporting in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a radio resource control (RRC) message including an indication of a number of physical uplink control channel (PUCCH) repetitions. The apparatus may also receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. Further, the apparatus may select one PUCCH resource set of the one or more PUCCH resource sets based on an uplink control information (UCI) size. The apparatus may also transmit, to the base station, a PUCCH via the PUCCH resource of the one or more PUCCH resource sets, the transmitted PUCCH corresponding to the number of PUCCH repetitions.

In an aspect of the disclosure, a method, a computer-readable medium, and an apparatus are provided. The apparatus may be a base station. The apparatus may transmit, to a user equipment (UE), a radio resource control (RRC) message including an indication of a number of physical uplink control channel (PUCCH) repetitions. The apparatus may also transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. The apparatus may also receive, from the UE, a PUCCH via the PUCCH resource of the one or more PUCCH resource sets, the received PUCCH corresponding to the number of PUCCH repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram illustrating example PUCCH repetitions.

FIG. 6B is a diagram illustrating example PUCCH repetitions.

FIG. 6C is a diagram illustrating example PUCCH repetitions.

DETAILED DESCRIPTION

Figure 1:
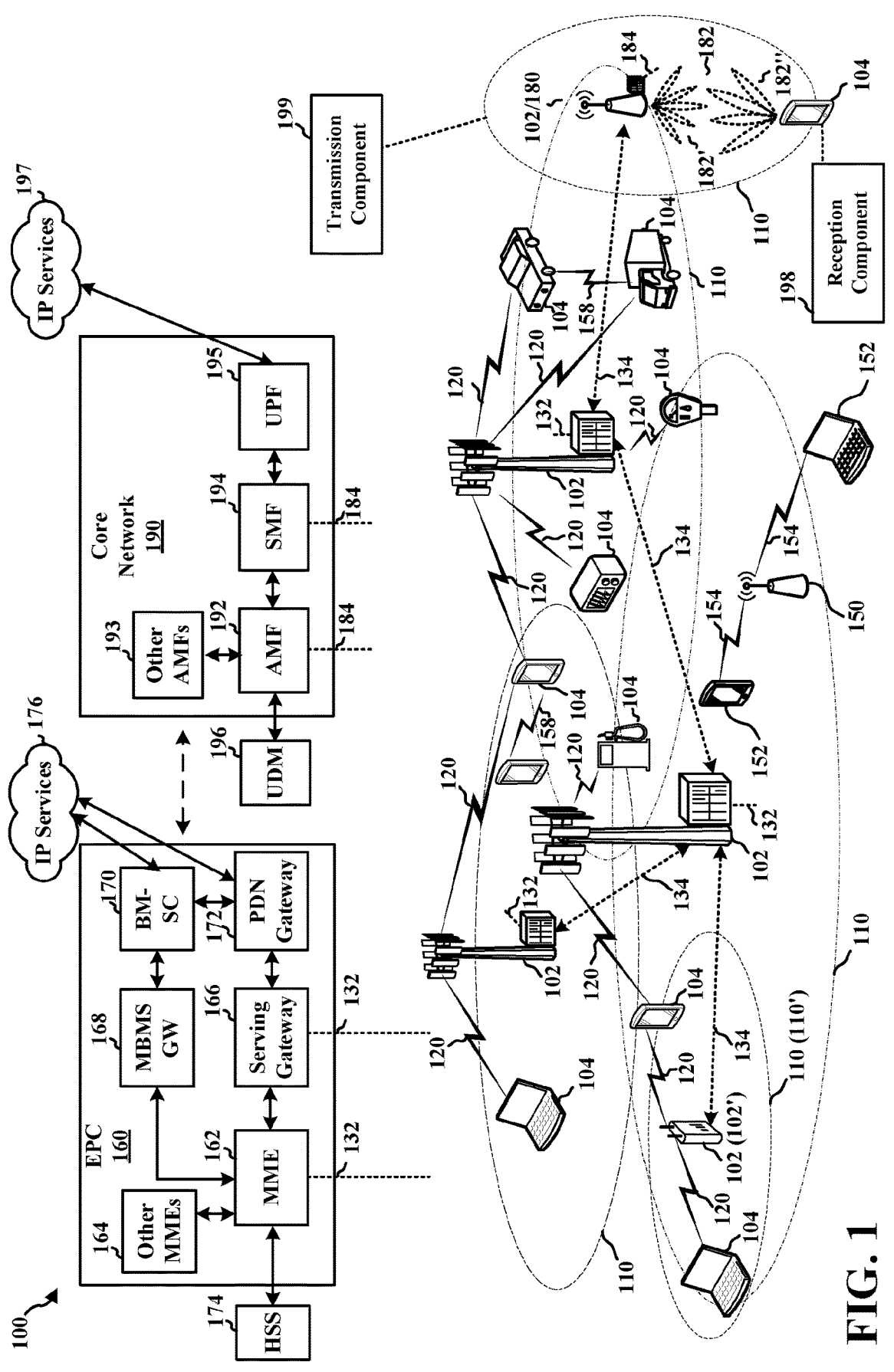
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive, from a base station, a radio resource control (RRC) message including an indication of a number of physical uplink control channel (PUCCH) repetitions. Reception component 198 may also be configured to receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. Reception component 198 may also be configured to select one PUCCH resource set of the one or more PUCCH resource sets based on an uplink control information (UCI) size. Reception component 198 may also be configured to transmit, to the base station, a PUCCH via the PUCCH resource of the one or more PUCCH resource sets, the transmitted PUCCH corresponding to the number of PUCCH repetitions.

Referring again to FIG. 1, in certain aspects, the base station 180 may include a transmission component 199 configured to transmit, to a user equipment (UE), a radio resource control (RRC) message including an indication of a number of physical uplink control channel (PUCCH) repetitions. Transmission component 199 may also be configured to transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. Transmission component 199 may also be configured to receive, from the UE, a PUCCH via the PUCCH resource of the one or more PUCCH resource sets, the received PUCCH corresponding to the number of PUCCH repetitions.

Although the following description may be focused on 5G NR, the concepts described herein may be applicable to other similar areas, such as LTE, LTE-A, CDMA, GSM, and other wireless technologies.

Figures 2A, 2B, 2C, 2D:
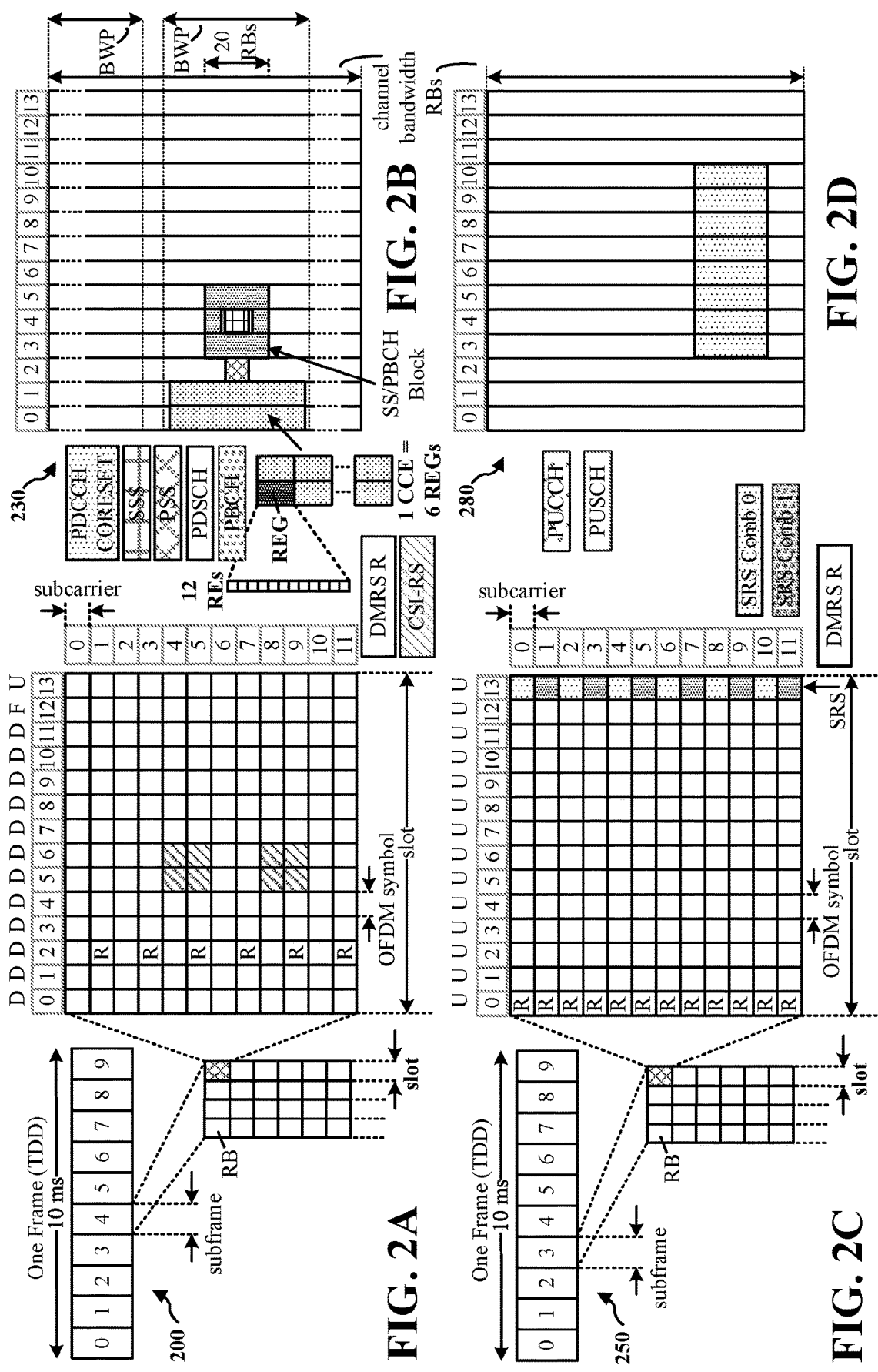
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
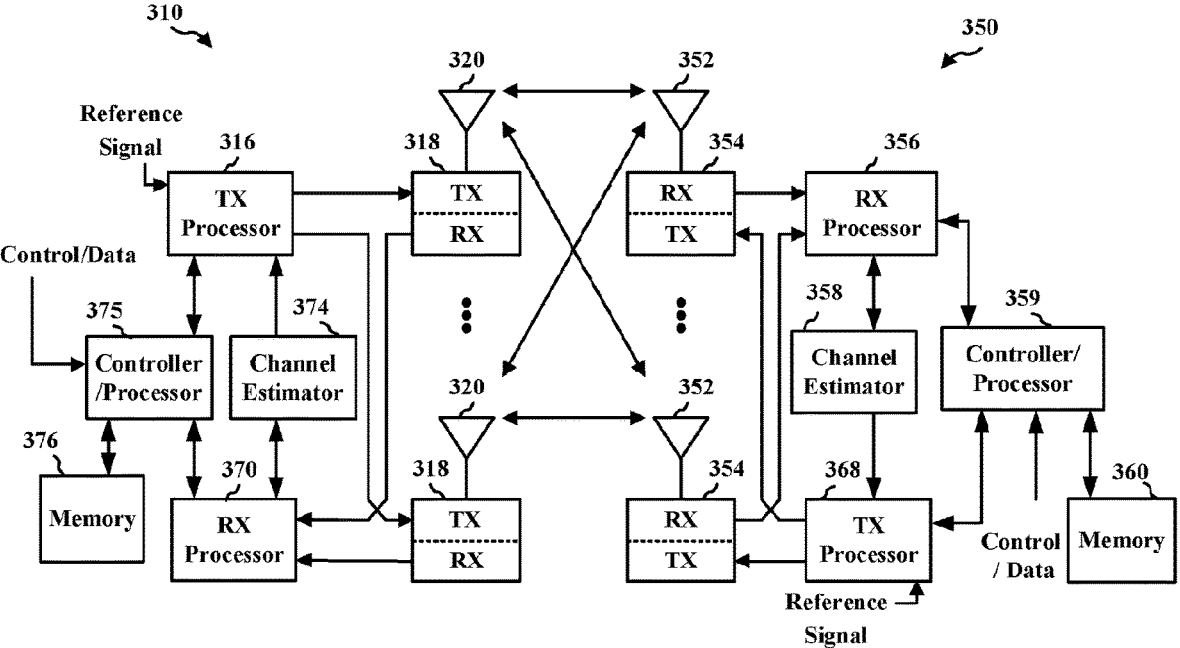
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
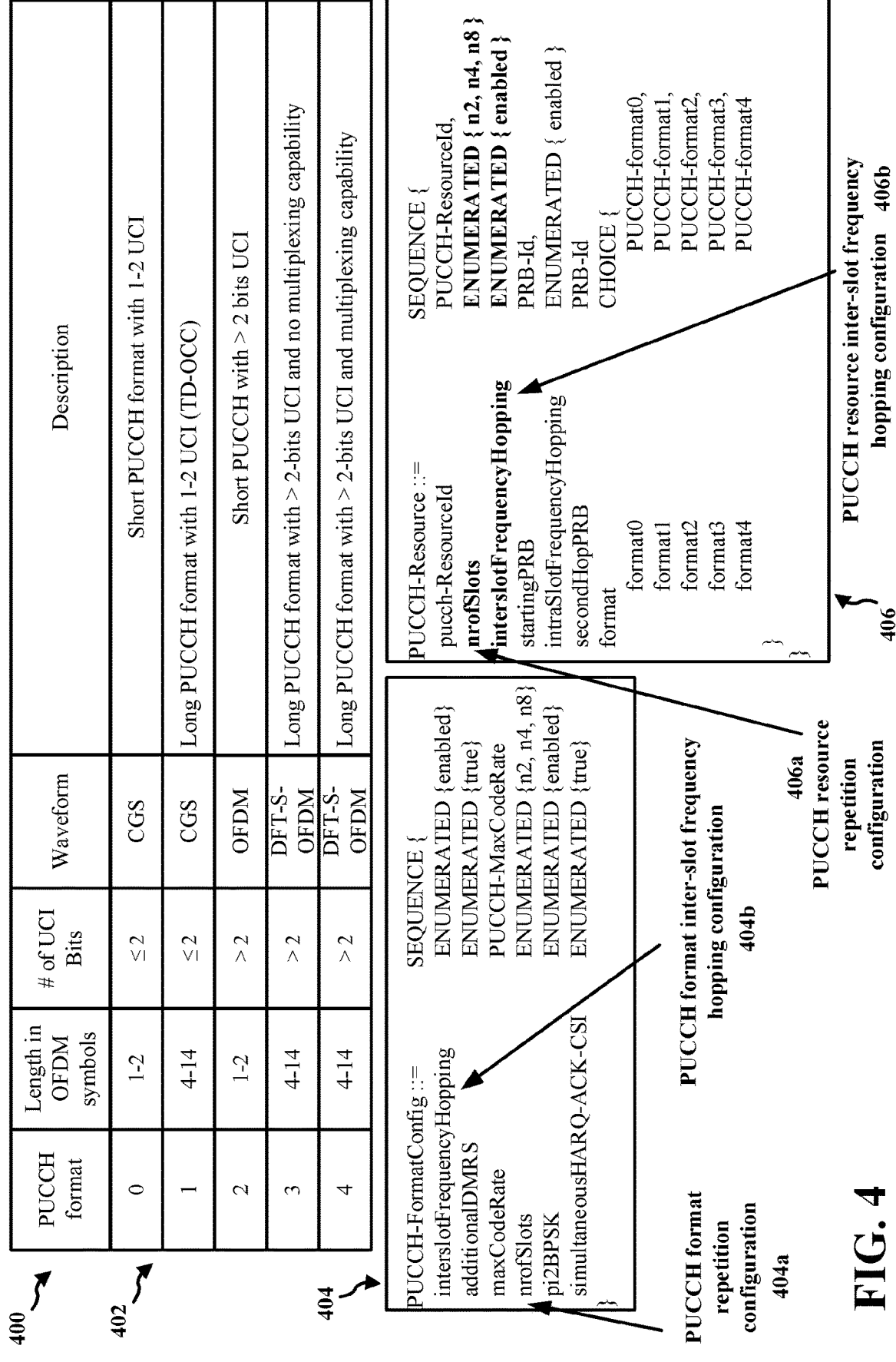
FIG. 4 is a diagram illustrating PUCCH formats, a PUCCH format configuration IE, and a PUCCH resource IE.

FIG. 4 is a diagram 400 illustrating PUCCH formats 402, a PUCCH format configuration information element (IE) 404, and a PUCCH resource IE 406. Some aspects of wireless communication, e.g., new radio (NR), may define multiple (e.g., five) PUCCH formats with a short/long duration, different payload size ranges, and different multiplexing capabilities. PUCCH format 0 is a short PUCCH format with 1-2 UCI bits, where the waveform is a computer generated sequence (CGS). PUCCH format 1 is a long PUCCH format with 1-2 UCI bits, using time division orthogonal cover codes (TD-OCC), where the waveform is a CGS. PUCCH format 2 is a short PUCCH format with greater than 2 UCI bits, where the waveform is OFDM. PUCCH format 3 is a long PUCCH format with greater than 2 UCI bits and no multiplexing capability, where the waveform is DFT-s-OFDM. PUCCH format 4 is a long PUCCH format with greater than 2 UCI bits and multiplexing capability, where the waveform is DFT-s-OFDM.

PUCCH resources may be configured via RRC signaling through the PUCCH resource IE 406. In some aspects, up to 128 PUCCH resources may be configured. The PUCCH format for each PUCCH resource may be a part of the RRC configuration. That is, the PUCCH resource IE 406 may include a format field defining the PUCCH format (e.g., one of the five formats) for that PUCCH resource. Also, a spatial relation (e.g., a beam) may be activated by a MAC-CE per PUCCH resource. For multiplexing HARQ-ACK in a PUCCH resource, DCI (e.g., a DCI format that schedules PDSCH and the corresponding HARQ-ACK information) may indicate a PUCCH resource indicator (PRI). The PUCCH resource may be indicated by a PRI within DCI. Accordingly, a PUCCH resource may be selected dynamically (i.e., dynamically configured for a UE) for an HARQ-ACK transmission.

PUCCH repetitions in different slots may be supported for certain PUCCH formats, e.g., PUCCH formats 1, 3, and 4. A number of PUCCH repetitions may be RRC configured for a given PUCCH format through the 'number of slots' (nrofSlots) field (e.g., 2, 4, or 8 slots) within the PUCCH format configuration IE 404. The format field nrofSlots may be referred to as a PUCCH format repetition configuration 404a. As the PUCCH format configuration IE 404 configures a format with the same PUCCH format repetition configuration 404a, all PUCCH resources with that format may have the same PUCCH format repetition configuration 404a (i.e., the same number of PUCCH repetitions). Likewise, the PUCCH inter-slot frequency hopping configuration may be RRC configured for a given PUCCH format through the field 'interslotFrequencyHopping' within the PUCCH format configuration IE 404. The format field interslotFrequencyHopping may be referred to as a PUCCH format inter-slot frequency hopping configuration 404b. As the PUCCH format configuration IE 404 configures a format with the same PUCCH format inter-slot frequency hopping configuration 404b, all PUCCH resources with that format may have the same PUCCH format inter-slot frequency hopping configuration 404b (i.e., with inter-slot frequency hopping disabled/enabled). The same PUCCH resource may be used across all the repetitions in different slots. In one example, one PUCCH-SpatialRelationInfo (e.g., beam) may be used. Also, the same symbols may be used in each slot.

As discussed supra, the format field interslotFrequency-Hopping may be referred to as a PUCCH format inter-slot frequency hopping configuration 404b. If interslotFrequen-cyHopping is enabled for a PUCCH format, the UE may transmit the PUCCH for the PUCCH format starting from a first physical resource block (PRB), provided by a starting PRB (startingPRB) in slots with an even number, and starting from the second PRB, provided by a second hop PRB (secondHopPRB) in slots with an odd number. The slot indicated to the UE for the first PUCCH transmission may have a number 0. Also, a UE may not expect to be configured to perform frequency hopping for a PUCCH transmission within a slot.

For PUCCH repetitions, the number of PUCCH repetitions may be semi-statically configured through RRC signaling. As such, the number of PUCCH repetitions may not be flexibly controlled. As discussed supra, the PUCCH repetition may be configured per PUCCH format. As such, all PUCCH transmissions with that PUCCH format may have the same number of PUCCH repetitions. For example, it may not be possible to have no PUCCH repetitions (e.g., one PUCCH repetition) for a first PUCCH transmission with PUCCH format 1 while having two PUCCH repetitions for a second PUCCH transmission with PUCCH format 1 unless RRC reconfigures the number of PUCCH repetitions for PUCCH format 1. There may be no options available for dynamically indicating the number of PUCCH repetitions for a PUCCH resource, such as via a MAC-CE or DCI.

In a first configuration, a number of PUCCH repetitions and/or inter-slot (or inter-repetition) frequency hopping may be RRC configured per PUCCH resource configuration (e.g., instead of per PUCCH format, or overriding the configuration per PUCCH format). For example, the PUCCH resource IE 406 may provide a PUCCH resource configuration associated with a PUCCH resource. The PUCCH resource configuration for the PUCCH resource may indicate a PUCCH resource repetition configuration 406a through, for example, the field nrofSlots (indicated in bold in FIG. 4), and/or a PUCCH resource inter-slot frequency hopping configuration 406b through, for example, the field interslotFrequencyHopping (indicated in bold in FIG. 4). Both the PUCCH resource repetition configuration 406a and the PUCCH resource inter-slot frequency hopping configuration 406b may be specifically for the PUCCH resource and may be independent of PUCCH formats.

For an HARQ-ACK transmission, DCI may include a PRI field that indicates a PUCCH resource with a number of PUCCH repetitions. Accordingly, dynamic indication of the number of PUCCH repetitions may be achieved by dynamic indication of a PUCCH resource. For periodic CSI/scheduling request (SR) (e.g., PUCCH resource is RRC configured without DCI signaling) as well as HARQ-ACK, configuring the PUCCH repetition and PUCCH inter-slot frequency hopping for a PUCCH resource may enable using the same PUCCH format with a different number of PUCCH repetitions by using different PUCCH resources. Accordingly, PUCCH repetitions and PUCCH inter-slot frequency hopping may be more flexibly configured.

Additionally, a MAC-CE may update, overwrite, or enable the number of PUCCH repetitions per PUCCH resource. The MAC-CE may update the spatial relation information (e.g., beam) for a given PUCCH resource. The same MAC-CE message may be used for this purpose, for example, by adding a field to the MAC-CE. In a first configuration, a MAC-CE may indicate the number of PUCCH repetitions. In a second configuration, a MAC-CE may activate or deactivate more than one PUCCH repetition. For example, more than one PUCCH repetition may be configured as part of the PUCCH resource configuration, but a MAC-CE may include one bit to indicate whether that number is used or no repetition is assumed (i.e., one repetition). If the number of PUCCH repetitions is not configured via RRC signaling, but a MAC-CE indicates a PUCCH repetition is activated, a default number of PUCCH repetitions (e.g., two PUCCH repetitions) may be assumed. A MAC-CE may also enable or disable PUCCH inter-slot frequency hopping when a PUCCH repetition is enabled or the number of PUCCH repetitions is indicated to be greater than one.

With respect to conflict resolution of a legacy RRC configuration through the PUCCH format configuration IE 404 versus the aforementioned RRC configuration through the PUCCH resource IE 406, if the number of PUCCH repetitions/PUCCH inter-slot frequency hopping (i.e., enabled or disabled) is configured for a PUCCH format, a UE may determine whether to use the PUCCH format repetition configuration 404a or the PUCCH resource repetition configuration 406a, and may determine whether to use the PUCCH format inter-slot frequency hopping configuration 404b or the PUCCH resource inter-slot frequency hopping configuration 406b. If a PUCCH resource that is configured with that PUCCH format is configured (e.g., via RRC signaling) or activated (e.g., via a MAC-CE) with a different number of PUCCH repetitions or a different configuration of PUCCH inter-slot frequency hopping, the UE may override the PUCCH format repetition configuration 404a with the PUCCH resource repetition configuration 406a and override the PUCCH format inter-slot frequency hopping configuration 404b with the PUCCH resource inter-slot frequency hopping configuration 406b. That is, the PUCCH resource parameters may overwrite/override the PUCCH format parameters. If a PUCCH resource that is configured with that PUCCH format is not configured or activated with a number of PUCCH repetitions or a configuration of PUCCH inter-slot frequency hopping, in a first configuration, the RRC configuration of the PUCCH format may be assumed (for a PUCCH repetition and/or PUCCH inter-slot frequency hopping) when a PUCCH is transmitted using the PUCCH resource. In a second configuration, no PUCCH repetition and/or no PUCCH inter-slot frequency hopping may be assumed when a PUCCH is transmitted using the PUCCH resource.

In some aspects of wireless communications, the number of slot-based PUCCH repetitions may be configured by higher layers for each PUCCH format. Considering mixed traffic types for a UE and different traffic types may have different reliabilities and latencies, a different number of repetitions (e.g., either slot-based or sub-slot based) may be utilized for a PUCCH associated with different traffic types and/or UCI types (e.g., HARQ ACK, scheduling request (SR), CSI). Moreover, since the channel condition may be dynamically changed, PUCCH repetition numbers by semi-static indication may result in an unnecessary resource waste or low transmission reliability. Therefore, the number of PUCCH repetitions may be indicated by DCI dynamically.

The number of PUCCH repetitions may be configured per PUCCH format or per PUCCH resource. When a PUCCH is scheduled, the number of PUCCH repetitions configured for the PUCCH may be applied. However, a PUCCH resource may be scheduled for multiple types of transmissions. For example, a PUCCH resource may be scheduled for periodic or semi-persistent transmissions of a CSI report, which may be referred as a periodic (P) or semi-persistent (SP) PUCCH transmission, and the PUCCH may also be scheduled with an aperiodic transmission for an aperiodic CSI report, which may be referred to as an aperiodic (AP) PUCCH transmission. So if the repetition number is configured per PUCCH format or per PUCCH resource to a PUCCH resource, all of periodic, semi-persistent, or aperiodic transmissions related to the same PUCCH resource may be impacted and use the same number of repetitions. For example, when a same PUCCH resource is used for different types of transmissions, e.g., one for a periodic CSI report and another for an ACK/NACK transmission, both the periodic CSI and the ACK/NACK transmission may use the same number of PUCCH repetitions associated with the PUCCH resource or PUCCH format. Based on the above, it may be beneficial to dynamically indicate a PUCCH repetition number. For instance, it may be beneficial to include an RRC message and/or DCI with a dynamic PUCCH repetition number.

Aspects of the present disclosure may include a PUCCH via DCI with a dynamic PUCCH repetition number. For instance, when a UE is enabled to be indicated with a dynamic PUCCH repetition number, the repetition number may be indicated by an enhanced existing DCI field. Aspects of the present disclosure may include a PUCCH resource indicator (PRI), where each PRI codepoint is associated with a repetition number. Additionally, aspects of the present disclosure may include a PDSCH-to-HARQ feedback timing indicator (which is to indicate the slot offset K1, from a PDSCH reception to the transmission of HARQ feedback), where each K1 codepoint is associated with a repetition number.

TABLE 1

| PRI or K1 codepoints in a DCI field | | | |
|---|---|---|---|
| 1 bit | 2 bits | 3 bits | Number of repetitions |
| '0' | '00' | '000' | $1^{st}$ value provided by ResourceList-v17xy or Dl-DataToUL-ACK-v17 |
| '1' | '01' | '001' | $2^{nd}$ value provided by ResourceList-v17xy or Dl-DataToUL-ACK-v17 |

TABLE 1-continued

| PRI or K1 codepoints in a DCI field | | | |
|---|---|---|---|
| 1 bit | 2 bits | 3 bits | Number of repetitions |
| | '10' | '010' | $3^{rd}$ value provided by ResourceList-v17xy or Dl-Data ToUL-ACK-v17 |
| | '11' | '011' | $4^{th}$ value provided by ResourceList-v17xy or Dl-DataToUL-ACK-v17 |
| | | '100' | $5^{th}$ value provided by ResourceList-v17xy or Dl-DataToUL-ACK-v17 |
| | | '101' | $6^{th}$ value provided by ResourceList-v17xy or Dl-DataToUL-ACK-v17 |
| | | '110' | $7^{th}$ value provided by ResourceList-v17xy or Dl-DataToUL-ACK-v17 |
| | | '111' | $8^{th}$ value provided by ResourceList-v17xy or Dl-DataToUL-ACK-v17 |

Table 1 above shows a PRI or K1 codepoints in a DCI field, as well as a number of repetitions. As shown in Table 1, ResourceList-v17xy or D1-DataToUL-ACK-v17 may have a list of values for the number of PUCCH repetitions. For example, ResourceList-v17xy may be configured as above with a list of the repetition number PUCCH-ResourceandNumR-v17xy which is to provide a number of PUCCH repetitions of either two repetitions (n2), four repetitions (n4), eight repetitions (n8), or sixteen repetitions (n16). For example, ResourceList-v17xy::=SEQUENCE (SIZE(1 . . . maxNrofPUCCH-ResourcesPerSet)) OF PUCCH-ResourceandNumR-v17xy. In some instances, PUCCH-ResourceandNumR-v17xy::=SEQUENCE {repetitionNumber-r17 ENUMERATED {n2, n4, n8, n16}}.

In another example, D1-DataToUL-ACK-v17 may be configured as above with a list of the repetition number D1-DataToUL-ACKandNumR which is to provide a number of PUCCH repetitions of either two repetitions (n2), four repetitions (n4), eight repetitions (n8), or sixteen repetitions (n16). Also, D1-DataToUL-ACK-v17::=SEQUENCE (SIZE(1 . . . I)) OF D1-DataToUL-ACKandNumR, and D1-DataToUL-ACKandNumR::=SEQUENCE {repetitionNumber-r17 ENUMERATED {n2, n4, n6, n8, n16}}.

Figure 5:
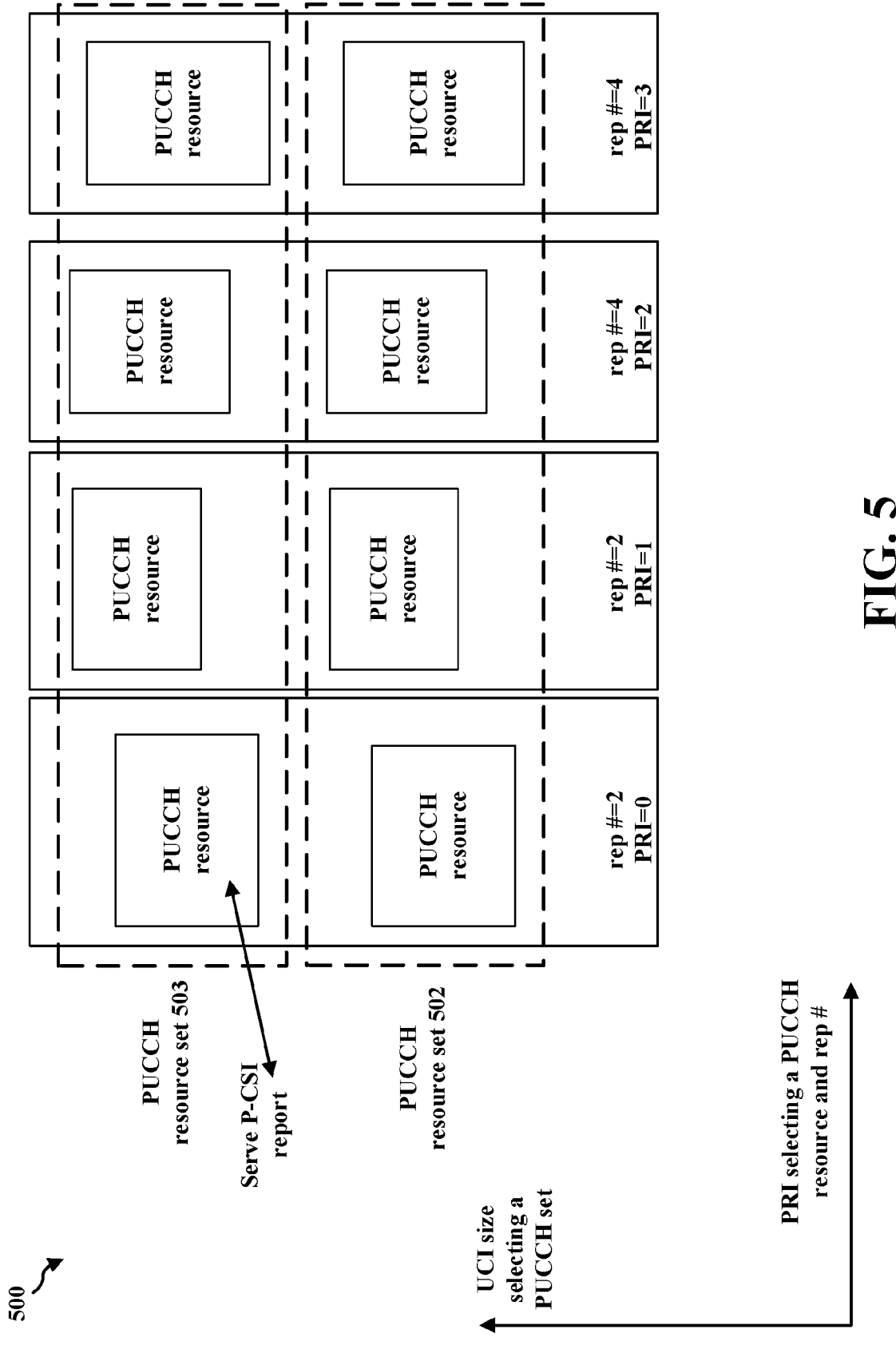
FIG. 5 is a diagram illustrating example PUCCH resource allocation.

FIG. 5 is a diagram 500 illustrating example PUCCH resource allocation. FIG. 5 includes a second PUCCH resource set and a third PUCCH resource set. Additionally, FIG. 5 shows that PUCCH resources in each PUCCH resource set are associated with PRI 0, PRI 1, PRI 2, and PRI 3, as well as a number of repetitions (rep #), e.g., two repetitions or four repetitions. As shown in FIG. 5, a PUCCH resource set may be firstly determined based on a UCI size, and a PUCCH resource and repetition number may be secondly determined based on an enhanced PRI indication in the DCI.

Tables 2 and 3 below depict different codepoints in a DCI field. More specifically, Table 2 shows K1 codepoints in a DCI field, as well as a number of repetitions. In addition, Table 3 shows PRI codepoints in a DCI field, as well as a number of repetitions. By using enhanced PRI or K1 codepoints to indicate the number of PUCCH repetitions, two different DCI codepoints may have the same value of PRI or K1 value to the indicated PUCCH resource, but the number of PUCCH repetitions may be different. For example, in Table 2, both the first and the second K1 codepoints indicate a K1 value of 2, while the number of PUCCH repetitions (Rep) are respectively 2 and 4.

TABLE 2

| K1 codepoints in a DCI field | | | |
|---|---|---|---|
| 1 bit | 2 bits | 3 bits | Number of repetitions |
| '0' | '00' | '000' | K1 = 2, Rep = 2 |
| '1' | '01' | '001' | K1 = 2, Rep = 4 |
| | '10' | '010' | K1 = 3, Rep = 2 |
| | '11' | '011' | K1 = 3, Rep = 4 |
| | | '100' | K1 = 4, Rep = 4 |
| | | '101' | |
| | | '110' | |
| | | '111' | |

TABLE 3

| PRI codepoints in a DCI field | | | |
|---|---|---|---|
| 1 bit | 2 bits | 3 bits | Number of repetitions |
| '0' | '00' | '000' | PRI = 2, Rep = 2 |
| '1' | '01' | '001' | PRI = 2, Rep = 4 |
| | '10' | '010' | PRI = 3, Rep = 2 |
| | '11' | '011' | PRI = 3, Rep = 4 |
| | | '100' | PRI = 4, Rep = 4 |
| | | '101' | |
| | | '110' | |
| | | '111' | |

In some aspects, when a dynamic number of PUCCH repetitions is indicated by DCI, the dynamic number of PUCCH repetitions may overwrite the semi-statically configured number of PUCCH repetitions for the PUCCH transmission scheduled by the DCI. For example, in FIG. 5, if a PUCCH resource is used for a periodic (P) CSI report, and also for ACK/NACK feedback, when the PUCCH is transmitted for a P-CSI report, a first number of PUCCH repetitions may be used which is semi-statically configured to the PUCCH format or PUCCH resource, and when the PUCCH is transmitted for ACK/NACK feedback, a second number of PUCCH repetitions may be used which is indicated by DCI and the first number of PUCCH repetitions may not be used.

An indicated PUCCH repetition number from the DCI may be associated with a number of options. For instance, the indicated PUCCH repetition number may be an overall repetition number. In this case, the number may count both PUCCH repetitions of different beam information. For example, if the indicated PUCCH repetition number is 4, and two types of beam information (UL TCI1 and UL TCI2, or spatial relation information 1 and spatial relation information 2) are indicated for the PUCCH, the number of PUCCH repetitions may be 2 for each type of beam information.

Additionally, the indicated PUCCH repetition number may be an actual repetition number or a beam indicated number. In this case, the same number may apply for a PUCCH repetition of different beam information. For example, if the indicated PUCCH repetition number is 2, and two types of beam information (UL TCI1 and UL TCI2, or spatial relation information 1 and spatial relation information 2) are indicated for the PUCCH, the number of PUCCH repetitions may be 2 for each type of beam information.

Further, the indicated PUCCH repetition number may be a scale of the PUCCH repetition number configured per PUCCH format or per PUCCH resource. For example, if the PUCCH repetition configured for a PUCCH format is 4, the indicated number may be 0.5 or 2. Also, there may be two PUCCH repetitions if the indicated dynamic number of PUCCH repetitions is 0.5, and eight PUCCH repetitions if the indicated dynamic number of PUCCH repetitions is 2.

FIGS. 6A, 6B, and 6C are diagrams 600, 610, and 620, respectively, illustrating example PUCCH repetitions. FIG. 6A displays that an indicated PUCCH repetition number may be an overall repetition number, e.g., 4. As shown in FIG. 6A, the indicated PUCCH repetition number may include both PUCCH repetitions of different types of beam information. For instance, as the indicated PUCCH repetition number is 4, and two types of beam information (spatial relation information 1 and spatial relation information 2) are indicated for the PUCCH, the number of PUCCH repetitions is 2 for each type of beam information.

FIG. 6B displays that an indicated PUCCH repetition number may be an actual repetition number or a beam indicated number, e.g., 2. As shown in FIG. 6B, the same PUCCH repetition number may apply for a PUCCH repetition of different beam information. For instance, as the indicated PUCCH repetition number is 2, and two types of beam information (spatial relation information 1 and spatial relation information 2) are indicated for the PUCCH, the number of PUCCH repetitions is 2 for each type of beam information.

FIG. 6C displays that an indicated PUCCH repetition number may be a scale of the PUCCH repetition number, e.g., 0.5 or 2. As shown in FIG. 6C, the indicated PUCCH repetition number may be a scale of the PUCCH repetition number configured per PUCCH format or per PUCCH resource. For instance, if the PUCCH repetition configured for a PUCCH format is 4, the indicated number may be 0.5 or 2. As shown in FIG. 6C, there are two PUCCH repetitions as the indicated dynamic number of PUCCH repetitions is 0.5. Further, there may be eight PUCCH repetitions if the indicated dynamic number of PUCCH repetitions is 2.

Figure 7:
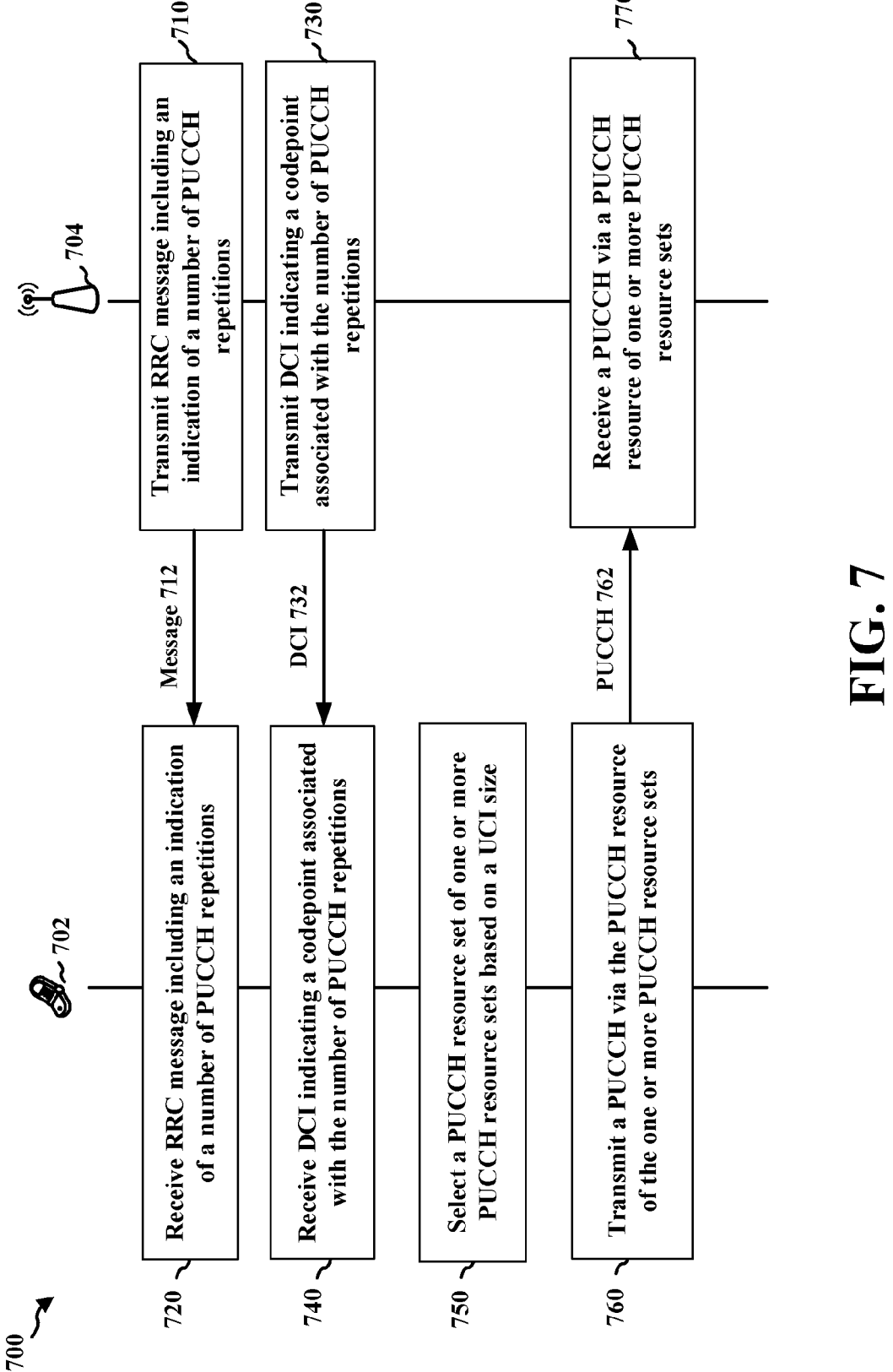
FIG. 7 is a diagram illustrating example communication between a UE and a base station.

FIG. 7 is a diagram 700 illustrating example communication between a UE 702 and a base station 704.

At 710, base station 704 may transmit, to UE 702, a radio resource control (RRC) message, e.g., message 712, including an indication of a number of physical uplink control channel (PUCCH) repetitions.

At 720, UE 702 may receive, from base station 704, a radio resource control (RRC) message, e.g., message 712, including an indication of a number of physical uplink control channel (PUCCH) repetitions. The indication may correspond to a resource list.

In some aspects, the number of PUCCH repetitions may be at least one of an overall repetition number, an actual repetition number, or a scaled value of the number of PUCCH repetitions configured based on a PUCCH format or the PUCCH resource. If the number of PUCCH repetitions is the overall repetition number, the overall repetition number may correspond to a number of PUCCH repetitions for spatial relation information 1 and a number of PUCCH repetitions for spatial relation information 2. If the number of PUCCH repetitions is the actual repetition number, the actual repetition number may apply to a number of PUCCH repetitions for spatial relation information 1 or a number of PUCCH repetitions for spatial relation information 2. If the number of PUCCH repetitions is the scaled value of the number of PUCCH repetitions, the scaled value of the number of PUCCH repetitions may be one half of the number of PUCCH repetitions or twice of the number of PUCCH repetitions.

At 730, base station 704 may transmit, to the UE 702, downlink control information (DCI), e.g., DCI 732, indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions.

At 740, UE 702 may receive, from the base station 704, downlink control information (DCI), e.g., DCI 732, indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions. The codepoint of the DCI may include at least one K1 value, and the at least one K1 value may correspond to the number of PUCCH repetitions. Also, the at least one K1 value may further correspond to a timing offset. The codepoint of the DCI may include the number of PUCCH repetitions, such that the number of PUCCH repetitions overwrites a previous number of PUCCH repetitions.

At 750, UE 702 may select one PUCCH resource set of the one or more PUCCH resource sets based on an uplink control information (UCI) size. In some instances, the DCI may indicate the UCI size. The at least one PRI may correspond to the selected one PUCCH resource set.

At 760, UE 702 may transmit, to the base station 704, a PUCCH, e.g., PUCCH 762, via the PUCCH resource of the one or more PUCCH resource sets, the transmitted PUCCH corresponding to the number of PUCCH repetitions.

At 770, base station 704 may receive, from the UE 702, a PUCCH, e.g., PUCCH 762, via the PUCCH resource of the one or more PUCCH resource sets, the received PUCCH corresponding to the number of PUCCH repetitions.

Figure 8:
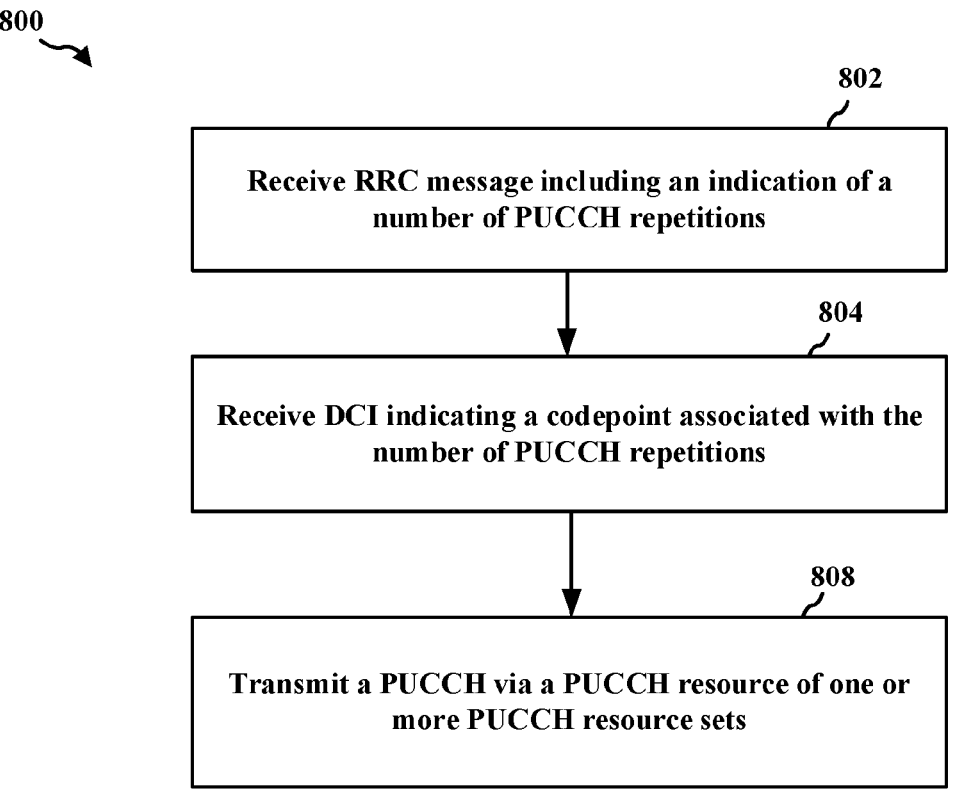
FIG. 8 is a flowchart of a method of wireless communication.

FIG. 8 is a flowchart 800 of a method of wireless communication. The method may be performed by a UE or a component of a UE (e.g., the UE 104, 350, 702; the apparatus 1102; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 802, the UE may receive, from a base station, a radio resource control (RRC) message including an indication of a number of physical uplink control channel (PUCCH) repetitions, as described in connection with the examples in FIGS. 4, 5, 6A, 6B, 6C, and 7. For example, UE 702 may receive, from a base station, a radio resource control (RRC) message including an indication of a number of physical uplink control channel (PUCCH) repetitions, as described in connection with 720 in FIG. 7. Further, 802 may be performed by determination component 1140 in FIG. 11. The indication may correspond to a resource list.

In some aspects, the number of PUCCH repetitions may be at least one of an overall repetition number, an actual repetition number, or a scaled value of the number of PUCCH repetitions configured based on a PUCCH format or the PUCCH resource. If the number of PUCCH repetitions is the overall repetition number, the overall repetition number may correspond to a number of PUCCH repetitions for spatial relation information 1 and a number of PUCCH repetitions for spatial relation information 2. If the number of PUCCH repetitions is the actual repetition number, the actual repetition number may apply to a number of PUCCH repetitions for spatial relation information 1 or a number of PUCCH repetitions for spatial relation information 2. If the number of PUCCH repetitions is the scaled value of the number of PUCCH repetitions, the scaled value of the number of PUCCH repetitions may be one half of the number of PUCCH repetitions or twice of the number of PUCCH repetitions.

At 804, the UE may receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with the examples in FIGS. 4, 5, 6A, 6B, 6C, and 7. For example, UE 702 may receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with 740 in FIG. 7. Further, 804 may be performed by determination component 1140 in FIG. 11. The codepoint of the DCI may include at least one K1 value, and the at least one K1 value may correspond to the number of PUCCH repetitions. Also, the at least one K1 value may further correspond to a timing offset. The codepoint of the DCI may include the number of PUCCH repetitions, such that the number of PUCCH repetitions overwrites a previous number of PUCCH repetitions.

At 808, the UE may transmit, to the base station, a PUCCH via the PUCCH resource of the one or more PUCCH resource sets, the transmitted PUCCH corresponding to the number of PUCCH repetitions, as described in connection with the examples in FIGS. 4, 5, 6A, 6B, 6C, and 7. For example, UE 702 may transmit, to the base station, a PUCCH via the PUCCH resource of the one or more PUCCH resource sets, the transmitted PUCCH corresponding to the number of PUCCH repetitions, as described in connection with 760 in FIG. 7. Further, 808 may be performed by determination component 1140 in FIG. 11.

Figure 9:
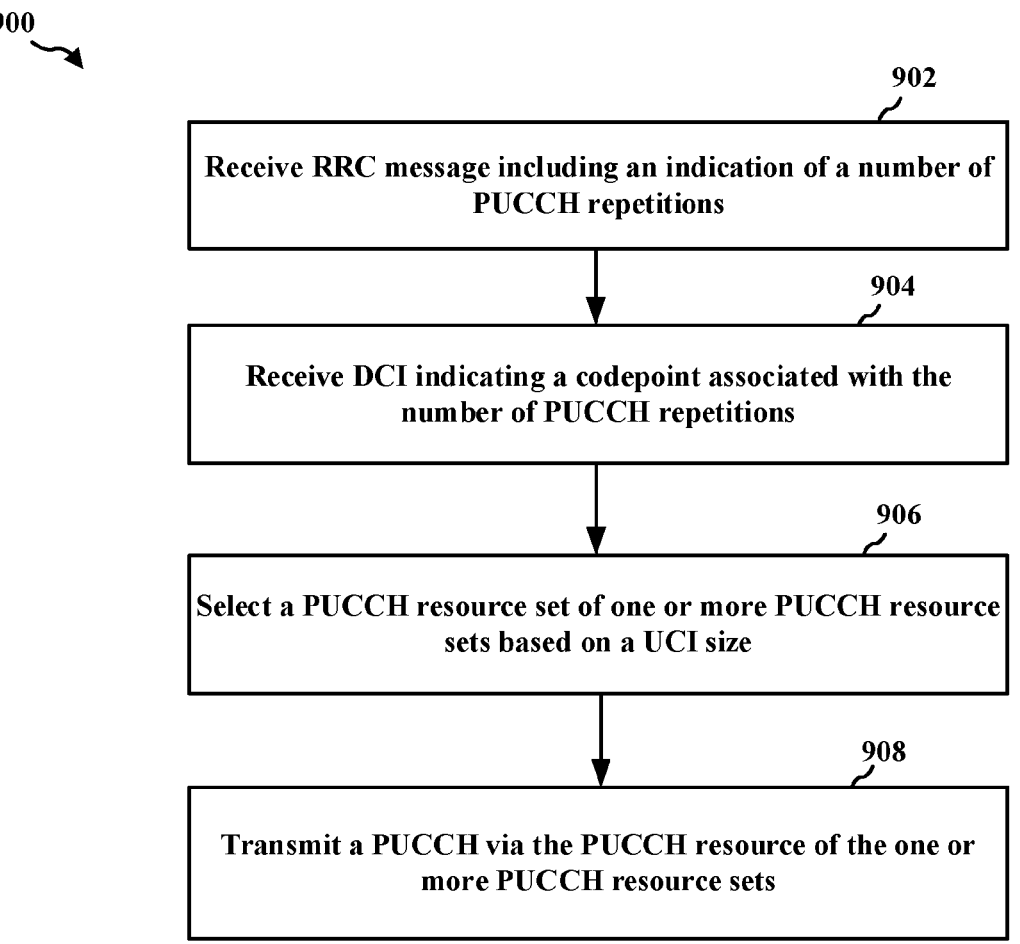
FIG. 9 is a flowchart of a method of wireless communication.

FIG. 9 is a flowchart 900 of a method of wireless communication. The method may be performed by a UE or a component of a UE (e.g., the UE 104, 350, 702; the apparatus 1102; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 902, the UE may receive, from a base station, a radio resource control (RRC) message including an indication of a number of physical uplink control channel (PUCCH) repetitions, as described in connection with the examples in FIGS. 4, 5, 6A, 6B, 6C, and 7. For example, UE 702 may receive, from a base station, a radio resource control (RRC) message including an indication of a number of physical uplink control channel (PUCCH) repetitions, as described in connection with 720 in FIG. 7. Further, 902 may be performed by determination component 1140 in FIG. 11. The indication may correspond to a resource list.

In some aspects, the number of PUCCH repetitions may be at least one of an overall repetition number, an actual repetition number, or a scaled value of the number of PUCCH repetitions configured based on a PUCCH format or the PUCCH resource. If the number of PUCCH repetitions is the overall repetition number, the overall repetition number may correspond to a number of PUCCH repetitions for spatial relation information 1 and a number of PUCCH repetitions for spatial relation information 2. If the number of PUCCH repetitions is the actual repetition number, the actual repetition number may apply to a number of PUCCH repetitions for spatial relation information 1 or a number of PUCCH repetitions for spatial relation information 2. If the number of PUCCH repetitions is the scaled value of the number of PUCCH repetitions, the scaled value of the number of PUCCH repetitions may be one half of the number of PUCCH repetitions or twice of the number of PUCCH repetitions.

At 904, the UE may receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with the examples in FIGS. 4, 5, 6A, 6B, 6C, and 7. For example, UE 702 may receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with 740 in FIG. 7. Further, 904 may be performed by determination component 1140 in FIG. 11. The codepoint of the DCI may include at least one K1 value, and the at least one K1 value may correspond to the number of PUCCH repetitions. Also, the at least one K1 value may further correspond to a timing offset. The codepoint of the DCI may include the number of PUCCH repetitions, such that the number of PUCCH repetitions overwrites a previous number of PUCCH repetitions.

At 906, the UE may select one PUCCH resource set of the one or more PUCCH resource sets based on an uplink control information (UCI) size, as described in connection with the examples in FIGS. 4, 5, 6A, 6B, 6C, and 7. For example, UE 702 may select one PUCCH resource set of the one or more PUCCH resource sets based on an uplink control information (UCI) size, as described in connection with 750 in FIG. 7. Further, 906 may be performed by determination component 1140 in FIG. 11. In some instances, the DCI may indicate the UCI size. The at least one PRI may correspond to the selected one PUCCH resource set.

At 908, the UE may transmit, to the base station, a PUCCH via the PUCCH resource of the one or more PUCCH resource sets, the transmitted PUCCH corresponding to the number of PUCCH repetitions, as described in connection with the examples in FIGS. 4, 5, 6A, 6B, 6C, and 7. For example, UE 702 may transmit, to the base station, a PUCCH via the PUCCH resource of the one or more PUCCH resource sets, the transmitted PUCCH corresponding to the number of PUCCH repetitions, as described in connection with 760 in FIG. 7. Further, 908 may be performed by determination component 1140 in FIG. 11.

Figure 10:
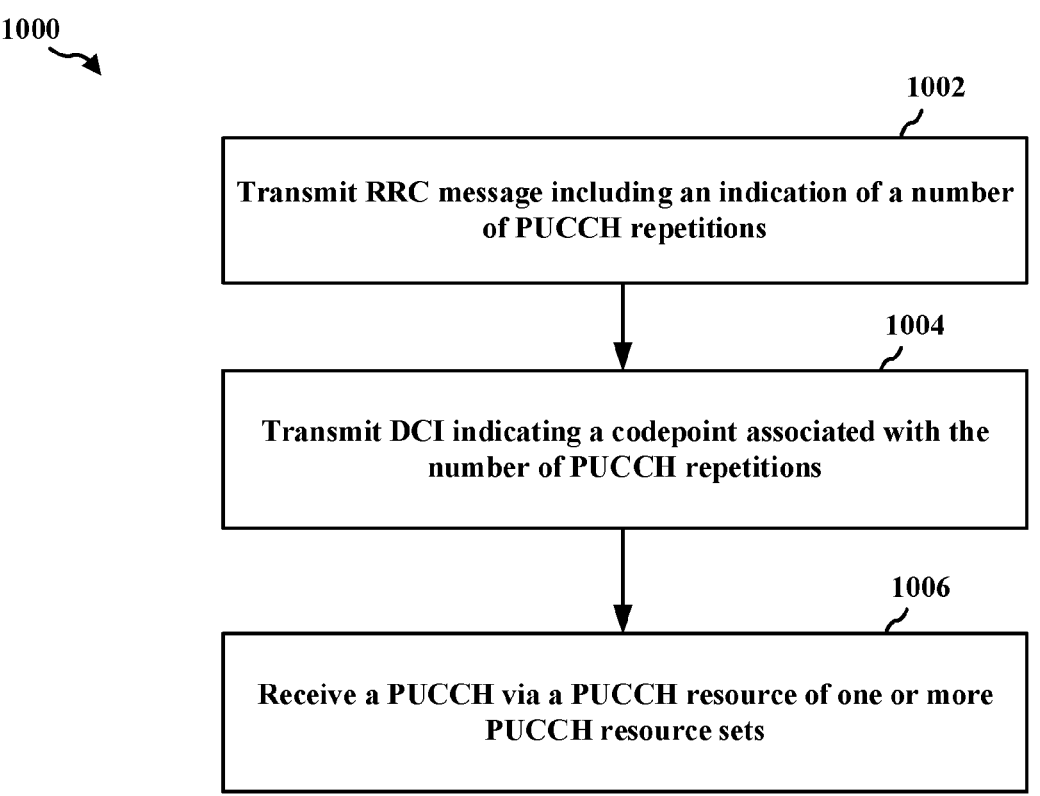
FIG. 10 is a flowchart of a method of wireless communication.

FIG. 10 is a flowchart 1000 of a method of wireless communication. The method may be performed by a base station or a component of a base station (e.g., the base station 102, 180, 310, 704; the apparatus 1202; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1002, the base station may transmit, to a UE, a radio resource control (RRC) message including an indication of a number of physical uplink control channel (PUCCH) repetitions, as described in connection with the examples in FIGS. 4, 5, 6A, 6B, 6C, and 7. For example, base station 704 may transmit, to a UE, a radio resource control (RRC) message including an indication of a number of physical uplink control channel (PUCCH) repetitions, as described in connection with 710 in FIG. 7. Further, 1002 may be performed by determination component 1240 in FIG. 12. The indication may correspond to a resource list.

In some aspects, the number of PUCCH repetitions may be at least one of an overall repetition number, an actual repetition number, or a scaled value of the number of PUCCH repetitions configured based on a PUCCH format or the PUCCH resource. If the number of PUCCH repetitions is the overall repetition number, the overall repetition number may correspond to a number of PUCCH repetitions for spatial relation information 1 and a number of PUCCH repetitions for spatial relation information 2. If the number of PUCCH repetitions is the actual repetition number, the actual repetition number may apply to a number of PUCCH repetitions for spatial relation information 1 or a number of PUCCH repetitions for spatial relation information 2. If the number of PUCCH repetitions is the scaled value of the number of PUCCH repetitions, the scaled value of the number of PUCCH repetitions may be one half of the number of PUCCH repetitions or twice of the number of PUCCH repetitions.

At 1004, the base station may transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with the examples in FIGS. 4, 5, 6A, 6B, 6C, and 7. For example, base station 704 may transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, as described in connection with 730 in FIG. 7. Further, 1004 may be performed by determination component 1240 in FIG. 12. The codepoint of the DCI may include at least one K1 value, and the at least one K1 value may correspond to the number of PUCCH repetitions. Also, the at least one K1 value may further correspond to a timing offset. The codepoint of the DCI may include the number of PUCCH repetitions, such that the number of PUCCH repetitions overwrites a previous number of PUCCH repetitions.

In some instances, one PUCCH resource set of the one or more PUCCH resource sets may be based on an uplink control information (UCI) size. The DCI may indicate the UCI size. Additionally, the at least one PRI may correspond to the selected one PUCCH resource set.

At 1006, the base station may receive, from the UE, a PUCCH via the PUCCH resource of the one or more PUCCH resource sets, the received PUCCH corresponding to the number of PUCCH repetitions, as described in connection with the examples in FIGS. 4, 5, 6A, 6B, 6C, and 7. For example, base station 704 may receive, from the UE, a PUCCH via the PUCCH resource of the one or more PUCCH resource sets, the received PUCCH corresponding to the number of PUCCH repetitions, as described in connection with 770 in FIG. 7. Further, 1006 may be performed by determination component 1240 in FIG. 12.

Figure 11:
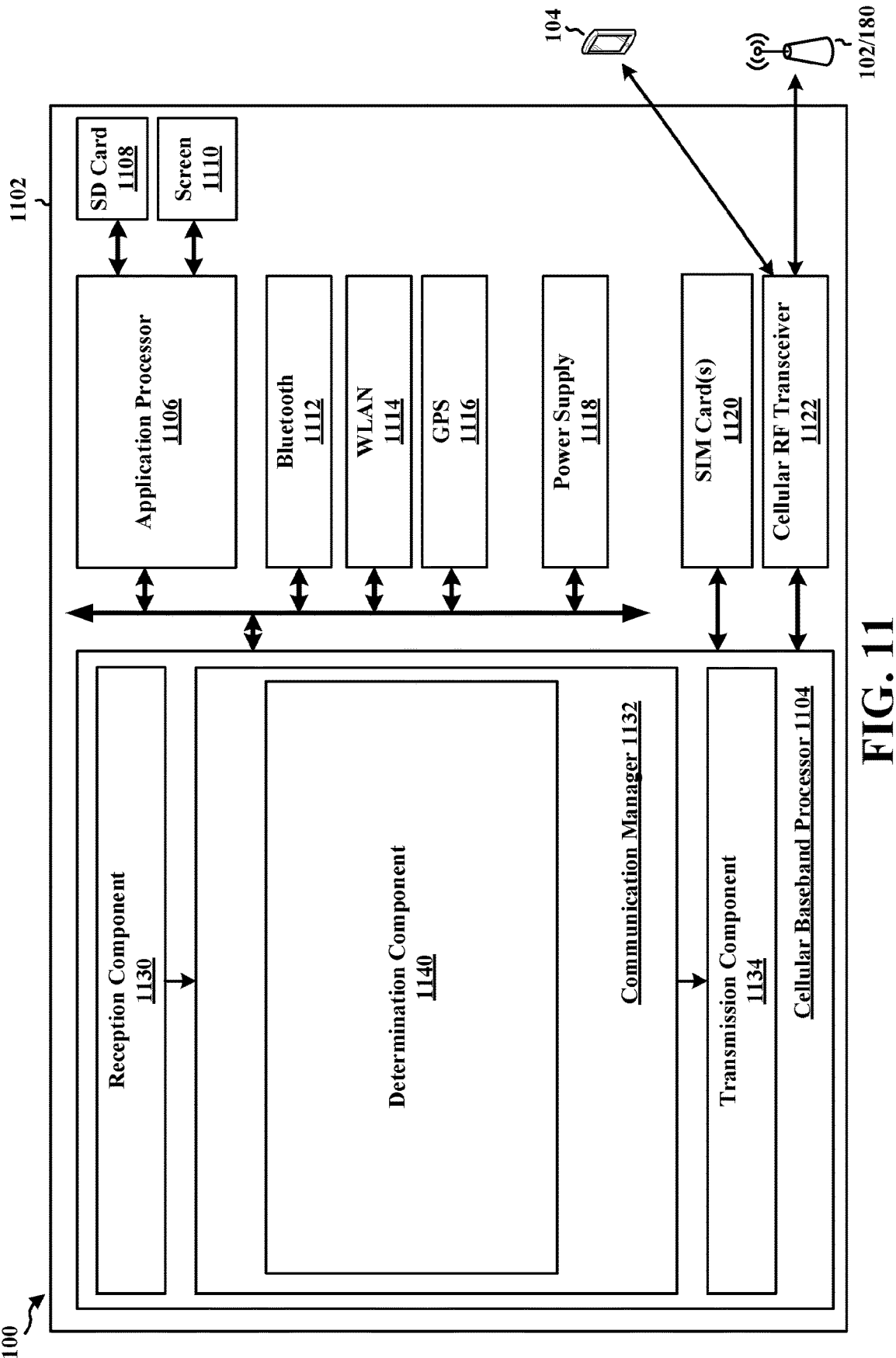
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a determination component 1140 that is configured to receive, from a base station, a radio resource control (RRC) message including an indication of a number of physical uplink control channel (PUCCH) repetitions, e.g., as described in connection with step 902 above. Determination component 1140 may also be configured to receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, e.g., as described in connection with step 904 above. Determination component 1140 may also be configured to select one PUCCH resource set of the one or more PUCCH resource sets based on an uplink control information (UCI) size, e.g., as described in connection with step 906 above. Determination component 1140 may also be configured to transmit, to the base station, a PUCCH via the PUCCH resource of the one or more PUCCH resource sets, the transmitted PUCCH corresponding to the number of PUCCH repetitions, e.g., as described in connection with step 908 above.

The apparatus may include additional components that perform each of the blocks of the algorithm in the aforementioned flowcharts of FIGS. 7, 8, and 9. As such, each block in the aforementioned flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, a radio resource control (RRC) message including an indication of a number of physical uplink control channel (PUCCH) repetitions; means for receiving, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions; means for selecting one PUCCH resource set of the one or more PUCCH resource sets based on an uplink control information (UCI) size; and means for transmitting, to the base station, a PUCCH via the PUCCH resource of the one or more PUCCH resource sets, the transmitted PUCCH corresponding to the number of PUCCH repetitions. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
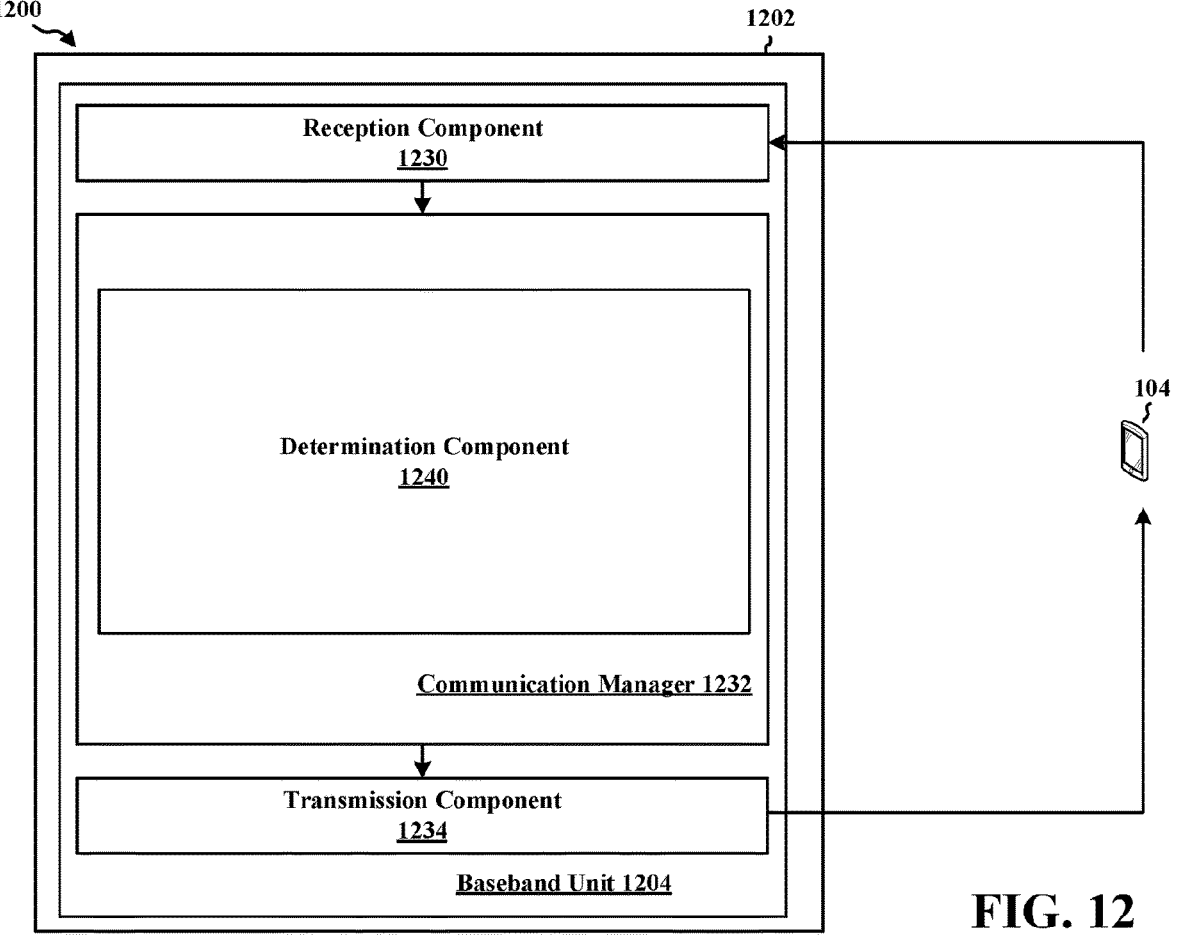
FIG. 12 is a diagram illustrating an example of a hardware implementation for an example apparatus.

FIG. 12 is a diagram 1200 illustrating an example of a hardware implementation for an apparatus 1202. The apparatus 1202 is a base station and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a determination component 1240 that is configured to transmit, to a user equipment (UE), a radio resource control (RRC) message including an indication of a number of physical uplink control channel (PUCCH) repetitions, e.g., as described in connection with step 1002 above. Determination component 1240 may also be configured to transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, e.g., as described in connection with step 1004 above. Determination component 1240 may also be configured to receive, from the UE, a PUCCH via the PUCCH resource of the one or more PUCCH resource sets, the received PUCCH corresponding to the number of PUCCH repetitions, e.g., as described in connection with step 1006 above.

The apparatus may include additional components that perform each of the blocks of the algorithm in the aforementioned flowcharts of FIGS. 7 and 10. As such, each block in the aforementioned flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a user equipment (UE), a radio resource control (RRC) message including an indication of a number of physical uplink control channel (PUCCH) repetitions; means for transmitting, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions; and means for receiving, from the UE, a PUCCH via the PUCCH resource of the one or more PUCCH resource sets, the received PUCCH corresponding to the number of PUCCH repetitions. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a base station, a radio resource control (RRC) message including an indication of a number of physical uplink control channel (PUCCH) repetitions; receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions; and transmit, to the base station, a PUCCH via the PUCCH resource of the one or more PUCCH resource sets, the transmitted PUCCH corresponding to the number of PUCCH repetitions.

Aspect 2 is the apparatus of aspect 1, where the codepoint of the DCI includes at least one K1 value, and the at least one K1 value corresponds to the number of PUCCH repetitions.

Aspect 3 is the apparatus of any of aspects 1 and 2, where the at least one K1 value further corresponds to a timing offset.

Aspect 4 is the apparatus of any of aspects 1 to 3, where the codepoint of the DCI includes the number of PUCCH repetitions, such that the number of PUCCH repetitions overwrites a previous number of PUCCH repetitions.

Aspect 5 is the apparatus of any of aspects 1 to 4, where the number of PUCCH repetitions is at least one of an overall repetition number, an actual repetition number, or a scaled value of the number of PUCCH repetitions configured based on a PUCCH format or the PUCCH resource.

Aspect 6 is the apparatus of any of aspects 1 to 5, where the number of PUCCH repetitions is the overall repetition number, and the overall repetition number corresponds to a number of PUCCH repetitions for spatial relation information 1 and a number of PUCCH repetitions for spatial relation information 2.

Aspect 7 is the apparatus of any of aspects 1 to 6, where the number of PUCCH repetitions is the actual repetition number, and the actual repetition number applies to a number of PUCCH repetitions for spatial relation information 1 or a number of PUCCH repetitions for spatial relation information 2.

Aspect 8 is the apparatus of any of aspects 1 to 7, where the number of PUCCH repetitions is the scaled value of the number of PUCCH repetitions, and the scaled value of the number of PUCCH repetitions is one half of the number of PUCCH repetitions or twice of the number of PUCCH repetitions.

Aspect 9 is the apparatus of any of aspects 1 to 8, where the at least one processor is further configured to: select one PUCCH resource set of the one or more PUCCH resource sets based on an uplink control information (UCI) size.

Aspect 10 is the apparatus of any of aspects 1 to 9, where the DCI indicates the UCI size.

Aspect 11 is the apparatus of any of aspects 1 to 10, where the at least one PRI corresponds to the selected one PUCCH resource set.

Aspect 12 is the apparatus of any of aspects 1 to 11, where the indication corresponds to a resource list.

Aspect 13 is the apparatus of any of aspects 1 to 12, further including a transceiver or an antenna coupled to the at least one processor.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is an apparatus for wireless communication at a base station including at least one processor coupled to a memory and configured to: transmit, to a user equipment (UE), a radio resource control (RRC) message including an indication of a number of physical uplink control channel (PUCCH) repetitions; transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions; and receive, from the UE, a PUCCH via the PUCCH resource of the one or more PUCCH resource sets, the received PUCCH corresponding to the number of PUCCH repetitions.

Aspect 18 is the apparatus of aspect 17, where the codepoint of the DCI includes at least one K1 value, and the at least one K1 value corresponds to the number of PUCCH repetitions.

Aspect 19 is the apparatus of any of aspects 17 and 18, where the at least one K1 value further corresponds to a timing offset.

Aspect 20 is the apparatus of any of aspects 17 to 19, where the codepoint of the DCI includes the number of PUCCH repetitions, such that the number of PUCCH repetitions overwrites a previous number of PUCCH repetitions.

Aspect 21 is the apparatus of any of aspects 17 to 20, where the number of PUCCH repetitions is at least one of an overall repetition number, an actual repetition number, or a scaled value of the number of PUCCH repetitions configured based on a PUCCH format or the PUCCH resource.

Aspect 22 is the apparatus of any of aspects 17 to 21, where the number of PUCCH repetitions is the overall repetition number, and the overall repetition number corresponds to a number of PUCCH repetitions for spatial relation information 1 and a number of PUCCH repetitions for spatial relation information 2.

Aspect 23 is the apparatus of any of aspects 17 to 22, where the number of PUCCH repetitions is the actual repetition number, and the actual repetition number applies to a number of PUCCH repetitions for spatial relation information 1 or a number of PUCCH repetitions for spatial relation information 2.

Aspect 24 is the apparatus of any of aspects 17 to 23, where the number of PUCCH repetitions is the scaled value of the number of PUCCH repetitions, and the scaled value of the number of PUCCH repetitions is one half of the number of PUCCH repetitions or twice of the number of PUCCH repetitions.

Aspect 25 is the apparatus of any of aspects 17 to 24, where one PUCCH resource set of the one or more PUCCH resource sets is based on an uplink control information (UCI) size.

Aspect 26 is the apparatus of any of aspects 17 to 25, where the DCI indicates the UCI size.

Aspect 27 is the apparatus of any of aspects 17 to 26, where the at least one PRI corresponds to the one PUCCH resource set.

Aspect 28 is the apparatus of any of aspects 17 to 27, where the indication corresponds to a resource list.

Aspect 29 is the apparatus of any of aspects 17 to 28, further including a transceiver or an antenna coupled to the at least one processor.

Aspect 30 is a method of wireless communication for implementing any of aspects 17 to 29.

Aspect 31 is an apparatus for wireless communication including means for implementing any of aspects 17 to 29.

Aspect 32 is a computer-readable medium storing computer executable code, where the code when executed by a processor causes the processor to implement any of aspects 17 to 29.

What is claimed is:

1. An apparatus for wireless communication at a user equipment (UE), comprising:
   memory; and
   at least one processor coupled to the memory and configured to:
      receive, from a base station, a radio resource control (RRC) message including an indication of a number of physical uplink control channel (PUCCH) repetitions;
      receive, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, wherein the codepoint of the DCI includes at least one K1 value corresponding to a timing offset, and the at least one K1 value further corresponds to the number of PUCCH repetitions;
      select one PUCCH resource set of the one or more PUCCH resource sets based on an uplink control information (UCI) size; and transmit, to the base station, a PUCCH transmission via the PUCCH resource of the one or more PUCCH resource sets, wherein the PUCCH transmission corresponds to the number of PUCCH repetitions.

2. The apparatus of claim 1, wherein the codepoint of the DCI includes the number of PUCCH repetitions, such that the number of PUCCH repetitions overwrites a previous number of PUCCH repetitions.

3. The apparatus of claim 1, wherein the number of PUCCH repetitions is at least one of an overall repetition number, an actual repetition number, or a scaled value of the number of PUCCH repetitions configured based on a PUCCH format or the PUCCH resource.

4. The apparatus of claim 3, wherein the number of PUCCH repetitions is the overall repetition number, and the overall repetition number corresponds to a number of PUCCH repetitions for spatial relation information 1 and a number of PUCCH repetitions for spatial relation information 2.

5. The apparatus of claim 3, wherein the number of PUCCH repetitions is the actual repetition number, and the actual repetition number applies to a number of PUCCH repetitions for spatial relation information 1 or a number of PUCCH repetitions for spatial relation information 2.

6. The apparatus of claim 3, wherein the number of PUCCH repetitions is the scaled value of the number of PUCCH repetitions, and the scaled value of the number of PUCCH repetitions is one half of the number of PUCCH repetitions or twice of the number of PUCCH repetitions.

7. The apparatus of claim 1, wherein the DCI indicates the UCI size.

8. The apparatus of claim 1, wherein the at least one PRI corresponds to the selected one PUCCH resource set.

9. The apparatus of claim 1, wherein the indication corresponds to a resource list.

10. The apparatus of claim 1, further comprising a transceiver or an antenna coupled to the at least one processor.

11. A method of wireless communication at a user equipment (UE), comprising:

receiving, from a base station, a radio resource control (RRC) message including an indication of a number of physical uplink control channel (PUCCH) repetitions;

receiving, from the base station, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, wherein the codepoint of the DCI includes at least one K1 value corresponding to a timing offset, and the at least one K1 value further corresponds to the number of PUCCH repetitions;

selecting one PUCCH resource set of the one or more PUCCH resource sets based on an uplink control information (UCI) size; and transmitting, to the base station, a PUCCH transmission via the PUCCH resource of the one or more PUCCH resource sets, wherein the PUCCH transmission corresponds to the number of PUCCH repetitions.

12. The method of claim 11, wherein the number of PUCCH repetitions is at least one of an overall repetition number, an actual repetition number, or a scaled value of the number of PUCCH repetitions configured based on a PUCCH format or the PUCCH resource.

13. An apparatus for wireless communication at a base station, comprising:

memory; and at least one processor coupled to the memory and configured to:

transmit, to a user equipment (UE), a radio resource control (RRC) message including an indication of a number of physical uplink control channel (PUCCH) repetitions;

transmit, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, wherein the codepoint of the DCI includes at least one K1 value corresponding to a timing offset, and the at least one K1 value further corresponds to the number of PUCCH repetitions; and receive, from the UE, a PUCCH transmission via the PUCCH resource of the one or more PUCCH resource sets, wherein the PUCCH transmission corresponds to the number of PUCCH repetitions, wherein one PUCCH resource set of the one or more PUCCH resource sets is based on an uplink control information (UCI) size.

14. The apparatus of claim 13, wherein the codepoint of the DCI includes the number of PUCCH repetitions, such that the number of PUCCH repetitions overwrites a previous number of PUCCH repetitions.

15. The apparatus of claim 13, wherein the number of PUCCH repetitions is at least one of an overall repetition number, an actual repetition number, or a scaled value of the number of PUCCH repetitions configured based on a PUCCH format or the PUCCH resource.

16. The apparatus of claim 15, wherein the number of PUCCH repetitions is the overall repetition number, and the overall repetition number corresponds to a number of PUCCH repetitions for spatial relation information 1 and a number of PUCCH repetitions for spatial relation information 2.

17. The apparatus of claim 15, wherein the number of PUCCH repetitions is the actual repetition number, and the actual repetition number applies to a number of PUCCH repetitions for spatial relation information 1 or a number of PUCCH repetitions for spatial relation information 2.

18. The apparatus of claim 15, wherein the number of PUCCH repetitions is the scaled value of the number of PUCCH repetitions, and the scaled value of the number of PUCCH repetitions is one half of the number of PUCCH repetitions or twice of the number of PUCCH repetitions.

19. The apparatus of claim 13, wherein the DCI indicates the UCI size.

20. The apparatus of claim 13, wherein the at least one PRI corresponds to the one PUCCH resource set.

21. The apparatus of claim 13, wherein the indication corresponds to a resource list.

22. The apparatus of claim 13, further comprising a transceiver or an antenna coupled to the at least one processor.

23. A method of wireless communication at a base station, comprising:

transmitting, to a user equipment (UE), a radio resource control (RRC) message including an indication of a number of physical uplink control channel (PUCCH) repetitions;

transmitting, to the UE, downlink control information (DCI) indicating a codepoint associated with the number of PUCCH repetitions, the codepoint including at least one PUCCH resource indicator (PRI) associated with a PUCCH resource of one or more PUCCH resource sets, the at least one PRI corresponding to the number of PUCCH repetitions, wherein the codepoint of the DCI includes at least one K1 value corresponding to a timing offset, and the at least one K1 value further corresponds to the number of PUCCH repetitions; and receiving, from the UE, a PUCCH transmission via the PUCCH resource of the one or more PUCCH resource sets, wherein the PUCCH transmission corresponds to the number of PUCCH repetitions, wherein one PUCCH resource set of the one or more PUCCH resource sets is based on an uplink control information (UCI) size.

* * * * *